(12) United States Patent
Wingen et al.

(10) Patent No.: US 7,399,505 B2
(45) Date of Patent: Jul. 15, 2008

(54) FLUORINATED PHENANTHRENES AND THEIR USE IN LIQUID-CRYSTAL MIXTURES

(75) Inventors: Rainer Wingen, Hofheim (DE); Barbara Hornung, Hasselroth (DE); Wolfgang Schmidt, Dreieich (DE)

(73) Assignee: Merck Patent GmbH, Darmstadt (DE)

( * ) Notice: Subject to any disclaimer, the term of this patent is extended or adjusted under 35 U.S.C. 154(b) by 25 days.

(21) Appl. No.: 11/122,856

(22) Filed: May 5, 2005

(65) Prior Publication Data

US 2005/0258400 A1 Nov. 24, 2005

(30) Foreign Application Priority Data

May 7, 2004 (DE) ................. 10 2004 022 728

(51) Int. Cl.
*C09K 19/32* (2006.01)
*C09K 19/52* (2006.01)
*C07C 25/22* (2006.01)
*C07C 43/225* (2006.01)

(52) U.S. Cl. .............. 428/1.1; 252/299.01; 252/299.62; 570/183; 570/187

(58) Field of Classification Search ................. 428/1.1; 252/299.62, 299.01; 570/183, 187
See application file for complete search history.

(56) References Cited

U.S. PATENT DOCUMENTS

| | | | |
|---|---|---|---|
| 5,648,021 | A | 7/1997 | Wingen et al. |
| 5,888,422 | A | 3/1999 | Manero et al. |
| 6,168,838 | B1 | 1/2001 | Schmidt et al. |
| 6,558,758 | B1 | 5/2003 | Yanai et al. |
| 6,793,984 | B2 * | 9/2004 | Bremer et al. ............ 428/1.1 |
| 2003/0227000 | A1 * | 12/2003 | Bremer et al. ......... 252/299.62 |
| 2004/0106798 | A1 | 6/2004 | Bremer et al. |
| 2004/0124399 | A1 | 7/2004 | Schmidt et al. |

FOREIGN PATENT DOCUMENTS

| | | |
|---|---|---|
| DE | 100 50 071 | 10/2000 |
| DE | 100 50 071 A 1 | 6/2001 |
| DE | 10225048 | * 12/2002 |
| DE | 195 00 768 C 2 | 11/2003 |
| EP | 1 223 210 | 1/2002 |
| EP | 0 837 851 B1 | 5/2002 |
| EP | 1 201 632 A1 | 5/2002 |
| EP | 0 946 473 B1 | 7/2002 |
| JP | 10-236992 | 9/1998 |
| WO | WO 01/10803 A1 | 2/2001 |
| WO | WO 02/055463 | 7/2002 |
| WO | WO 02/079344 | 10/2002 |

OTHER PUBLICATIONS

CAPLUS 1969: 481008.*
CAPLUS 1975: 530760.*

Mallory et al., "Nuclear spin-spin coupling via nonbonded interactions. III. Effects of molecular structure on through-space fluorine-fluorine and hydrogen-fluorine coupling", Journal of the American Chemical Society (1975), 97(16), 4770-1.*
Brown et al., "Aromatic Polyfluoro-Compounds-XXVIII 1,2,3,4-Tetrafluorodibenzofuran and Some Nucleophilic Replacement Reactions", Tetrahedron, vol. 3, pp. 4041—pp. 4045 (1967).
English language abstract of EP 1 223 210, 2002.
Machine English Translation of JP 10-236992 from the Japanese Patent Office, 1998.
Ichinose et al., "High Optical Anisotropy and Small Rotational Viscosity LC Mixture for Field-Sequential Color TN-LCDs", IDW, LTC4-3, pp. 77-pp. 80 (2000).

* cited by examiner

*Primary Examiner*—Shean C Wu
(74) *Attorney, Agent, or Firm*—Millen, White, Zelano & Branigan, P.C.

(57) ABSTRACT

Compounds of the formula (I) are described (I)

Figure 1:
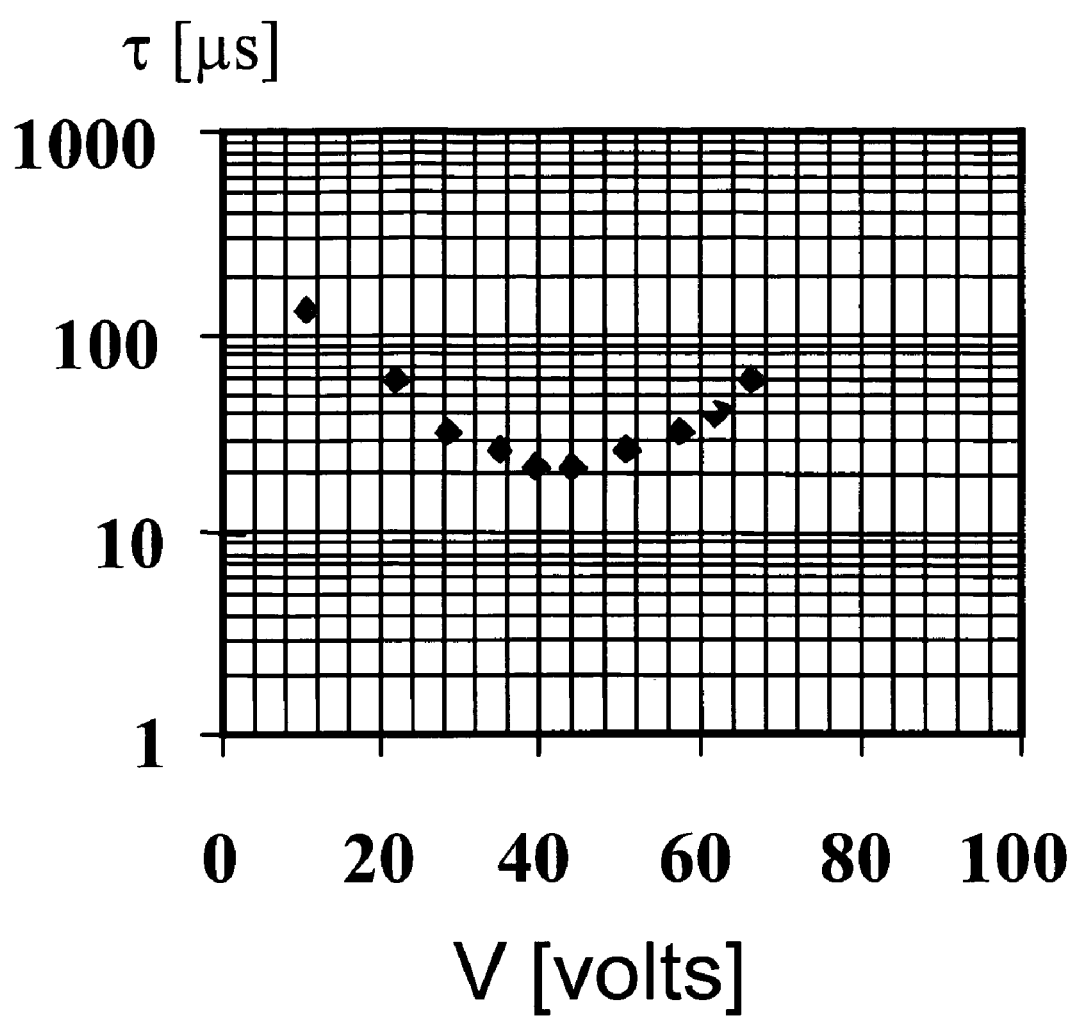

in which
$M^1$ is, for example, —CO—O— or a single bond
$A^1$ is, for example, 1,4-phenylene,
$R^5$ has the same possible definitions specified for $R^1$, with the exception of $-M^1-A^1-R^5$, but independently of the definition of $R^1$
$G^1-G^2$ is $CH_2CH_2$, CH=CH, $CF_2CF_2$, CF=CF, CF=CH, CH=CF
$X^1, X^2, X^3, X^4, X^5$ are each independently H or F
$R^1, Y^1, Y^2$ are each independently
a) H
b) F where $Y^1, R^1$, ($R^1$ and $Y^1$) or ($R^1$ and $Y^2$) may also have the definitions c) and/or d), but only in each case not more than one of ($R^1$ and $Y^1$) and of ($R^1$ and $Y^2$) may have the definition d)
c) is, for example, a straight-chain or branched alkyl radical having from 1 to 16 carbon atoms or a straight-chain or branched alkenyl radical having from 2 to 16 carbon atoms,
d) $-M^1-A^1-R^5$
with the following provisos:
a) at least one of $X^1, X^2, X^3, X^4, X^5, G^1-G^2$ is or contains F
b1) when at least one of $Y^1$ and $X^1$ is F and/or $G^1-G^2$ contains F, it is possible for $R^1, X^2, X^3, X^4$ not to be F
b2) when at least one of $R^1, X^2, X^3, X^4$ is F, it is possible for $X^1$ and $Y^1$ not to be F, and for $G^1-G^2$ to be $CH_2CH_2$ or CH=CH
c) it is not possible for $Y^2$ and $X^5$ simultaneously to be F.

20 Claims, 1 Drawing Sheet

FLUORINATED PHENANTHRENES AND THEIR USE IN LIQUID-CRYSTAL MIXTURES

This application claims priority to German Patent Application No. 10 2004 022 728.4, filed May 7, 2004.

An ever-increasing number of applications of LCDs, for example use in automobiles, in which a temperature range of from −40° C. to 100° C. can quite possibly exist, but also portable units such as cellphones and notebook PCs, requires liquid-crystal mixtures which have firstly a very wide working temperature range and secondly a minimum threshold voltage.

There is therefore a continuing demand for novel, suitable liquid-crystal mixtures and mixture components. As described in Ichinose et al. (IDW'00, Abstr. LCT4-3) or in DE-A 10050071, materials are being sought in which there is coexistence of high optical anisotropy (Δn) and low rotational viscosity, although other parameters such as high absolute values of dielectric anisotropy (Δε) are likewise preferentially required, in addition to further parameters relevant to the application.

Fluorinated phenanthrenes are known, for example, from DE-C 195 00 768, EP-B-0 837 851, EP-B-0 946 473 or WO 01/10803, and what are known as the wing groups, i.e. the alkyl and alkyloxy groups which are substantially responsible for the liquid-crystalline properties and the compatibility with other components of liquid-crystal mixtures, in the 2 and 7 positions of the particular phenanthrene skeletons are fixed in all cases.

However, since the manufacturers of liquid-crystal displays have a constant interest in improved liquid-crystal mixtures, there is still a need for further components of liquid-crystal mixtures, with which individual parameters relevant to the application, for example the dielectric anisotropy (Δε) or the optical anisotropy (Δn), but also the position of mesophase transitions and the solubility of similar structures, can be optimized.

It is therefore an object of the present invention to provide novel components for use in nematic or cholesteric or chiral-smectic liquid-crystal mixtures which have high absolute values of dielectric anisotropy combined with a favorable ratio of viscosity to clearing point. In addition, the compounds should to a high degree preferably be light- and UV-stable, and also thermally stable. In addition, they should be suitable for realizing a high voltage holding ratio (VHR). In addition, they should have good synthetic accessibility and therefore potentially be inexpensive.

According to the invention, the objects are achieved by compounds of the formula (I)

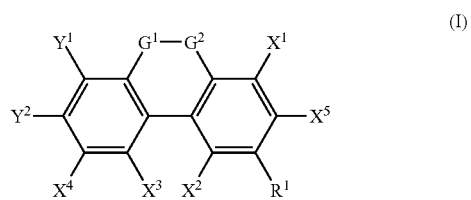

(I)

in which
$M^1$ —CO—O—, —O—CO—, —CH$_2$—O—, —O—CH$_2$—, —CF$_2$—O—, —O—CF$_2$—, —CH=CH—, —CF=CF—, —C≡C—, —CH$_2$—CH$_2$—CO—O—, —O—CO—CH$_2$—CH$_2$—, —CH$_2$—CH$_2$—, —CF$_2$—CF$_2$—, —(CH$_2$)$_4$—, —OC(=O)CF=CF— or a single bond $A^1$ is 1,4-phenylene in which one or two hydrogen atoms may be replaced by F, Cl, CN and/or OCF$_3$, or three hydrogen atoms may be replaced by fluorine, 1,4-cyclohexylene in which one or two hydrogen atoms may be replaced by CH$_3$ and/or F, 1-cyclohexene-1,4-diyl in which one hydrogen atom may be replaced by CH$_3$ or F, pyrimidine-2,5-diyl, pyridine-2,5-diyl or 1,3-dioxane-2,5-diyl $R^5$ has the same possible definitions specified for $R^1$, with the exception of -$M^1$-$A^1$-$R^5$, but independently of the definition of $R^1$ $G^1$-$G^2$ is CH$_2$CH$_2$, CH=CH, CF$_2$CF$_2$, CF=CF, CF=CH, CH=CF $X^1$, $X^2$, $X^3$, $X^4$, $X^5$ are each independently H or F $R^1$, $Y^1$, $Y^2$ are each independently a) H
b) F
 where $Y^1$, $R^1$, ($R^1$ and $Y^1$) or ($R^1$ and $Y^2$) may also have the definitions c) and/or d), but only in each case not more than one of ($R^1$ and $Y^1$) and of ($R^1$ and $Y^2$) may have the definition d)
c) is a straight-chain or branched alkyl radical having from 1 to 16 carbon atoms or a straight-chain or branched alkenyl radical having from 2 to 16 carbon atoms, in which
 c1) one or more nonadjacent and nonterminal CH$_2$ groups may be replaced by —O—, —C(=O)O—, —O—C(=O)—, —O—C(=O)—O—, —C(=O)— or —Si(CH$_3$)$_2$— and/or
 c2) one CH$_2$ group may be replaced by —C≡C—, cyclopropane-1,2-diyl, cyclobutane-1,3-diyl, cyclohexane-1,4-diyl or phenylene-1,4-diyl and/or
 c3) one or more hydrogen atoms may be replaced by F and/or Cl
d) -$M^1$-$A^1$-$R^5$ with the following provisos:
a) at least one of $X^1$, $X^2$, $X^3$, $X^4$, $X^5$, $G^1$-$G^2$ is or contains F
b1) when at least one of $Y^1$ and $X^1$ is F and/or $G^1$-$G^2$ contains F, then $R^1$, $X^2$, $X^3$, $X^4$ cannot be F
b2) when at least one of $R^1$, $X^2$, $X^3$, $X^4$ is F, then $X^1$ and $Y^1$ cannot be F, and $G^1$-$G^2$ has to be CH$_2$CH$_2$ or CH=CH
c) it is not possible for $y^2$ and $X^5$ simultaneously to be F, and by liquid-crystal mixtures comprising these compounds.

The provisos b1), b2) and c) define that fluorine atoms may be present in the compounds of the formula I on the phenanthrene ring only above or below a theoretical axis running through $Y^2$ and $X^5$, including a possible further fluorine atom on this axis, i.e. in $Y^2$ or $X^5$.

Preference is given to compounds of the formulae (Ia) to (It):

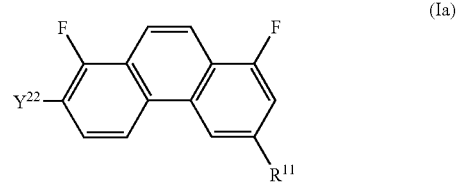

(Ia)

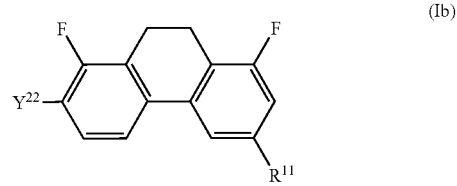

(Ib)

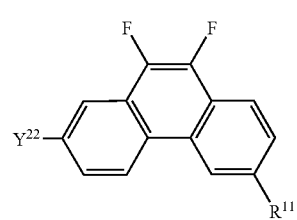 (Ic)
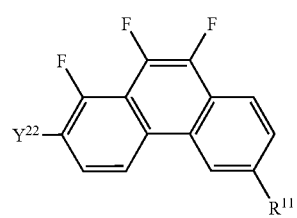 (Id)
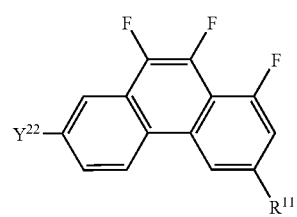 (Ie)
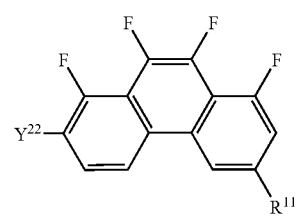 (If)
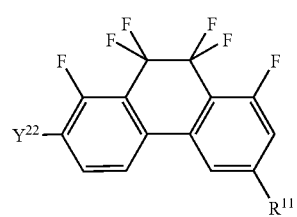 (Ig)
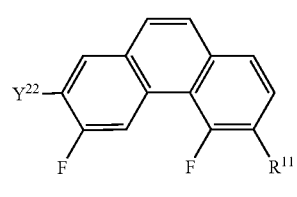 (Ih)
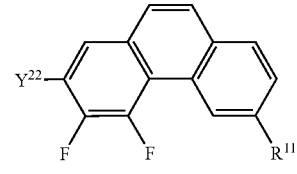 (Ii)
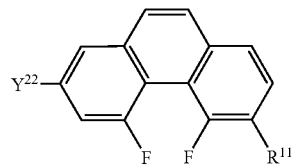 (Ij)
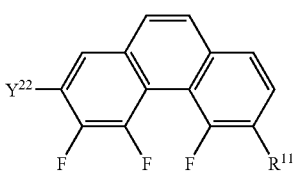 (Ik)
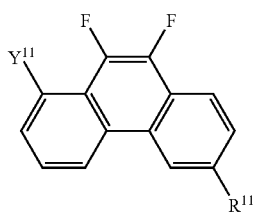 (Im)
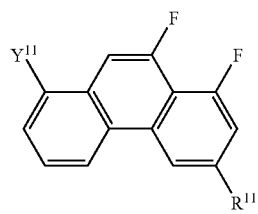 (In)
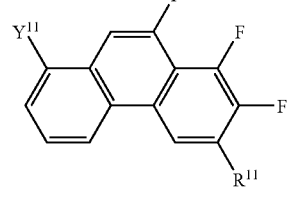 (Io)
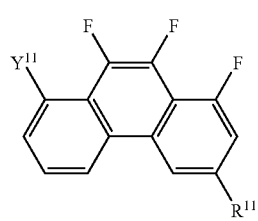 (Ip)
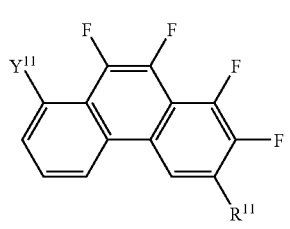 (Iq)

-continued

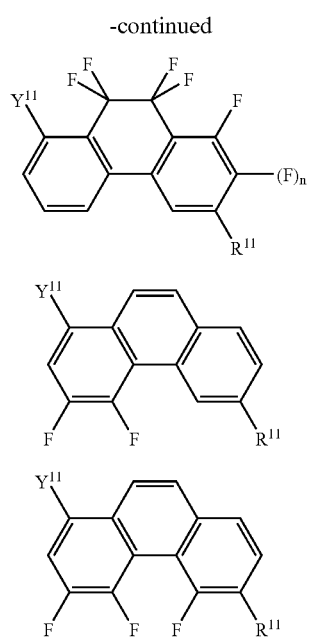

in which:

$R^{11}, Y^{11}, Y^{22}$ are each as specified for $R^1, Y^1, Y^2$ preferably each independently an alkyl or alkyloxy radical having from 1 to 10 carbon atoms or an alkenyl or alkenyloxy radical having from 2 to 10 carbon atoms, in which in each case one or more hydrogen atoms may also be replaced by F, or the $R^{15}$-$A^{15}$-$M^{15}$-moiety $R^{15}$ is as specified for $R^5$, preferably an alkyl or alkyloxy radical having from 1 to 10 carbon atoms or an alkenyl or alkenyloxy radical having from 2 to 10 carbon atoms $A^{15}$ is as specified for $A^1$, preferably phenylene-1,4-diyl, cyclohexane-1,4-diyl $M^{15}$ is as specified for $M^1$, preferably a single bond, —CO—O—, —O—CO—, —C≡C—, —OCF$_2$—, —CF$_2$O—, —CF$_2$CF$_2$—, —CH$_2$CH$_2$— n is 0 or 1, with the proviso that:
($R^{11}$ and $Y^{11}$) or ($R^{11}$ and $Y^{22}$) must not at the same time be $R^{15}$-$A^{15}$-$M^{15}$.

The provision of compounds of the formula (I) in a quite general sense considerably broadens the range of liquid-crystalline substances which are suitable for producing liquid-crystalline mixtures from different performance aspects.

In this context, the compounds of the formula (I) have a broad field of application. Depending on the selection of the substituents, they may be added to other classes of compound, in order, for example, to influence the dielectric and/or optical anisotropy of such a dielectric. They may also serve to optimize its threshold voltage and/or its viscosity. The compounds may also serve to increase the mesophase range or to adjust individual mesophases to parameters relevant to the application.

The compounds of the formula (I) are particularly suitable, even in small amounts in the mixture, for influencing the dielectric anisotropy (Δε) and/or the optical anisotropy Δn of liquid-crystal mixtures. The compounds of the formula (I) are particularly suitable, even in small amounts in the mixture, for reducing the response time of ferroelectric liquid-crystal mixtures. The compounds of the formula (I) are likewise particularly suitable for adjusting the broadness of the $S^c$ or N phase to application requirements. The addition of the inventive mixtures can also lead to the solubility limit of fluorinated derivatives of phenanthrene having wing groups in the 2 and 7 positions, as described in the introduction to the description, being raised, and to the proportion of compounds having a high absolute contribution to the dielectric anisotropy thus rising.

The present invention thus provides compounds of the formula (I) and for the use of these compounds as components of liquid-crystalline mixtures and liquid-crystalline mixtures comprising one or more compounds of the formula (I).

The compounds of the formula (I) may be used in various liquid-crystal mixtures, for example chiral-smectic, nematic or cholesteric liquid-crystal mixtures. In the case of nematic mixtures, they are particularly suitable for active matrix displays (AM-LCD) (see, for example, C. Prince, Seminar Lecture Notes, Volume I, p. M-3/3-M-22, SID International Symposium 1997, B. B. Bahadur, Liquid Crystal Applications and Uses, Vol. 1, p. 410, World Scientific Publishing, 1990, E. Lüder, Recent Progress of AMLCD's, Proceedings of the 15$^{th}$ International Display Research Conference, 1995, p. 9-12) and in plane-switching displays (IPS-LCD), and, in the case of smectic liquid-crystal mixtures, for smectic (ferroelectric or antiferroelectric) displays. Further display possibilities are the ECB and VA display mode in the case of nematic and cholesteric LC mixtures.

Further components of liquid-crystal mixtures which comprise inventive compounds of the formula (I) are preferably selected from the known compounds having smectic and/or nematic and/or cholesteric phases. Mixture components suitable in this context are listed in particular in WO 00/36054, DE-A-19 531 165 and EP-A-0 893 424, which are explicitly incorporated herein by way of reference.

The present invention therefore also provides liquid-crystal mixtures, which comprise at least one compound of the formula (I), preferably in an amount of from 1 to 40% by weight, based on the liquid-crystal mixture. The mixtures preferably comprise at least 3 further components of smectic and/or nematic and/or cholesteric phases in addition to compounds of the formula (I). The invention additionally provides electrooptical display elements (liquid-crystal displays) which comprise the inventive mixtures.

Preference is given to displays which comprise the inventive nematic or smectic (ferroelectric or antiferroelectric) mixtures in combination with active matrix elements.

The inventive displays are typically constructed in such a way that one liquid-crystal layer is enclosed on both sides by layers which are typically, in this sequence starting from the LC layer, at least one alignment layer, electrodes and a boundary layer (for example of glass). In addition, they may comprise spacers, adhesive frames, polarizers and thin color filter layers for color displays. Further possible components are antireflection, passivation, compensation and barrier layers, and also electrically nonlinear elements such as thin-film transistors (TFT) and metal-insulator-metal (MIM) elements. The construction of liquid-crystal displays has already been described in detail in relevant monographs (see, for example, E. Kaneko, "Liquid Crystal TV Displays: Principles and Applications of Liquid Crystal Displays", KTK Scientific Publishers, 1987).

Examples of possible synthetic routes to compounds of the formula (I) are specified in the schemes which follow, although other processes are also feasible and possible.

The following abbreviations are used:

| | |
|---|---|
| n-BuLi | n-butyllithium |
| s-BuLi | sec-butyllithium |
| DAST | diethylaminosulfur trifluoride |
| DCM | dichloromethane |
| DME | dimethoxyethane |
| DMF | N,N-dimethylformamide |
| DMSO | dimethyl sulfoxide |
| KOtBu | potassium tert-butoxide |
| LDA | lithium diisopropylamide |
| LICKOR | n-butyllithium + potassium tert-butoxide |
| LITMP | lithium 2,2,6,6-tetramethylpiperidide |
| MEK | methyl ethyl ketone (2-butanone) |
| MTBE | tert-butyl methyl ether |
| PCC | pyridinium chlorochromate |
| THF | tetrahydrofuran |
| TMEDA | tetramethylethylenediamine |
| 4-TsOH | 4-toluenesulfonic acid | a) Dimethyl sulfate, $K_2CO_3$, acetone
b) HC≡CTMS, $HN(iPr)_2$, Pd(II)/Cu catalysts according to U.S. Pat. No. 6,482,478, Scheme 6
c) $HN(iPr)_2$, Pd(0) catalyst according to U.S. Pat. No. 6,482,478, Scheme 6
d) $H_2$/Pd catalyst according to U.S. Pat. No. 6,482,478, Scheme 6
e) Photocyclization according to U.S. Pat. No. 6,482,478, Scheme 6
f) 1. Metalation 2. Reaction with electrophil according to WO02055463, Scheme 3
g) 1. $BBr_3$, DCM 2. Trifluoromethanesulfonic anhydride, pyridine 3. RC≡CH/Pd(PPh$_3$)$_2$Cl$_2$/CuI/NEt$_3$ 4. $H_2$/Pd(C) where $R^1$=alkyl or 1. $BBr_3$, DCM 2. $R^1Br$, $K_2CO_3$, MEK where $R^1$=alkyloxy according to WO02055463, Scheme 6
h) 1. $SOCl_2$ 2. $Et_2NH$ according to *Organikum, VEB Deutscher Verlag der Wissenschaften*, 15th Ed., Berlin, 1984, Ch. 7.1.5, p. 529 and 513;

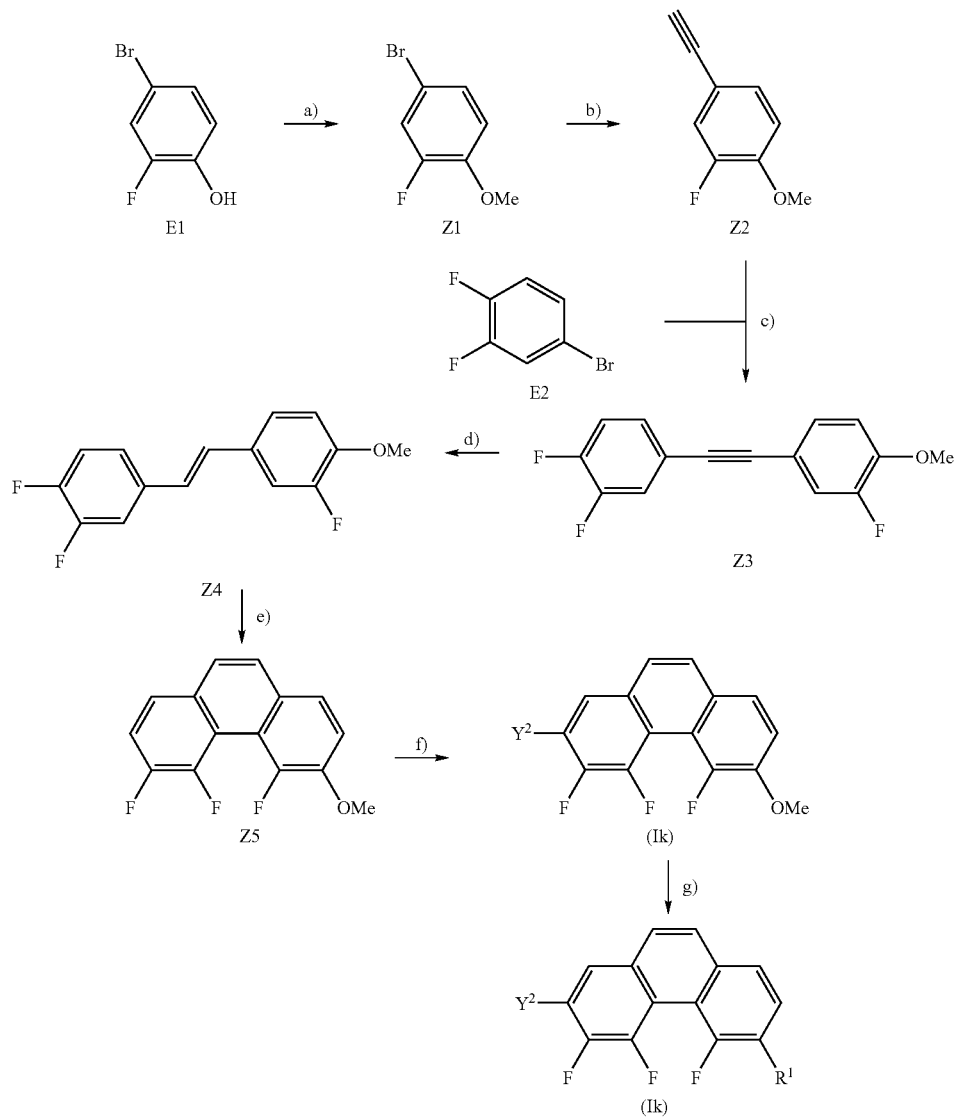

i) 1. s-BuLi, TMEDA 2. B(OMe)$_3$ 3. H$_3$O$^+$ according to *J. Org. Chem.* 56, 3763 (1991)
j) 1. LDA or LITMP 2. Dimethyl sulfate according to *Tetrahedron Lett.* 1996, 37, 6551
k) Pd catalyst according to *J. Org. Chem.* 1991, 56, 1683
l) LDA according to *Can. J. Chem.* 2000, 78, 905-919.
m) Selectfluor reagent according to U.S. Pat. No. 6,515,191
n) DAST, DCM according to U.S. Pat. No. 6,515,191
o) Zn/NH$_3$/THF according to U.S. Pat. No. 6,515,191
p) 1. H$_2$, Pd(C) according to *Mol. Cryst. Liq. Cryst.* 364, 865 (2001); 2. BuLi, Trifluoromethanesulfonic anhydride, according to *Can. J. Chem* 78, 905 (2000) 3. HCO$_2$H, Et$_3$N, Pd(OAc)$_2$, PPh$_3$ according to *Can. J. Chem* 78, 905 (2000)

Scheme 1 describes the synthesis of the compounds (Ik); the reactants required therefor E1 4-bromo-2-fluorophenol [2105-94-4] and E2 1-bromo-3,4-difluorobenzene [348-61-8] are commercially available.

When a compound E4 is used instead of E2 for reaction stage c), it is possible to prepare the compounds of the type (Ij) by the procedure of Scheme 1.

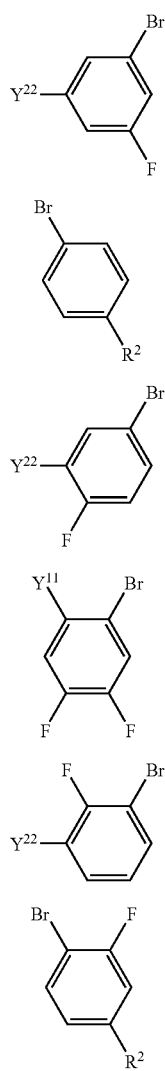

The reactants E4 where Y$^{22}$=methyl is known from the literature [202865-83-6] and commercially available. Reactants E4 where Y$^{22}$=alkyl can be prepared from the compound E4 where Y$^{22}$=CHO [188813-O$_2$-7] which is known from the literature by Wittig reaction with alkyltriphenylphosphonium halides and subsequent hydrogenation; alternatively, the commercially available compound where Y$^{22}$=CN [179898-34-1] can be reacted with alkylmagnesium halides and subsequently processed reductively to give the target compounds. Reactants E4 where Y$^{22}$=OMe [29578-39-0] and OEt [212307-87-4] are known from the literature; higher homologs may be obtained, for example, from 3-bromo-5-fluorophenol (E4 where Y$^{22}$=OH) [433939-27-6] by Williamson etherification with alkyl bromides.

When the reactant E5 (instead of Z1) is used in reaction stage b) and subsequently reacted with E2, it is possible by the procedure of Scheme 1 to prepare the compounds of the type (Ii). The 4-alkyl- or 4-alkyloxybromobenzenes (E5 where R$^2$=alkyl or alkyloxy) are commercially available or can be prepared by a multitude of methods known to those skilled in the art.

When the reactants E6 (instead of E2) are used in reaction stage c), it is possible by the procedure of Scheme 1 to prepare the compounds of the type (Ih). E6 where Y$^{22}$=ethyl [627463-25-6] is known from the literature; homologs can be prepared analogously. E6 where Y$^{22}$=methoxy [103291-07-2] is likewise known from the literature; the homologization is familiar to those skilled in the art.

When the reactants E7 (instead of E2) are used in reaction stage c), it is possible by the procedure of Scheme 1 to obtain the compounds of the type (It). E7 where Y$^{11}$=methoxy [202865-58-5] and hexyloxy [260260-81-9] are known from the literature, the former even commercially available. The preparation of homologs is familiar to those skilled in the art. After ether cleavage of the methoxy group (for example by means of HBr/glacial acetic acid or boron tribromide), conversion of the free OH group to the triflate and performance of suitable coupling reactions (for example Hagihara), it is also possible to prepare the derivatives where Y$^{11}$=alkyl. Equally 3,4-difluoro-6-methoxybenzaldehyde which is known from the literature can be converted to compounds E7 where Y$^{11}$=alkyl via the reaction sequence of Wittig reaction of alkyltriphenylphosphonium halides and hydrogenation; the OMe group becomes amenable to the coupling reaction stage c) by ether cleavage and conversion to the triflate.

When the reactant E5 (instead of Z1) is used in reaction stage b) and subsequently reacted with E7 in reaction stage c), it is possible by the procedure of Scheme 1 to prepare the compounds of the type (Is). The 4-alkyl- or 4-alkyloxybromobenzenes (E5 where R$^2$=alkyl or alkyloxy) are commercially available or can be prepared by a multitude of methods known to those skilled in the art.

Chromatographic methods, combined with recrystallizations, allow the regioisomers which occur in different amounts depending on the substitution pattern at the stage of the photocyclization (e) to be removed from the particular target products, either at the stage e) or its subsequent stages.

When reactants E8 (instead of E2) and E9 (instead of Z1) are used in reaction stages b) and c), it is possible by the procedure of Scheme 1 to obtain the compounds of the formula (Ia); hydrogenation (analogously to DE-A 19500768)

affords therefrom the compounds of the type (Ib). E8 where $Y^{22}$=methyl is known from the literature [59907-12-9]; alkyl homologs can be prepared by methods including oxidation (for example by means of Cr(VI)) of this compound to the corresponding aldehyde, Wittig reaction with alkyltriphenylphosphonium bromides and subsequent hydrogenation. E9 where $R^2$=methoxy [458-50-4] or propyl [167858-56-2] are commercially available, the preparation of homologs of other chain lengths is familiar to those skilled in the art.

Scheme 3 describes the synthesis of the compounds of the type (If). The reactant E10 where $R^2$=methyl is known from the literature [202865-83-6] and commercially available; reactants E10 where $R^2$=alkyl can be prepared from the compound E10 where $R^2$=CHO [188813-O$_2$-7] which is known from the literature by Wittig reaction with alkyltriphenylphosphonium halides and subsequently hydrogenation; alternatively, the commercially available compound where $R^2$=CN [179898-34-1] may be reacted with alkylmagnesium halides and subsequently processed reductively to the target compounds.

Reactants where $R^2$=OMe [29578-39-0] and OEt [212307-87-4] are known from the literature; higher homologs may be obtained, for example, from 3-bromo-5-fluorophenol (E1 where $R^2$=OH) [433939-27-6] by etherification with alkyl bromides.

The reactants E11 where $Y^{22}$=methyl [7697-23-6] and $Y^{22}$=methoxy [394-42-3] are known from the literature; the latter may serve for homologization in the manner described above (ether cleavage, subsequent reaction to give alkyl or else alkyloxy derivatives).

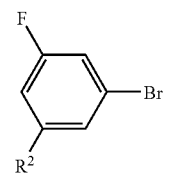
E10

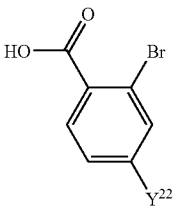
E11

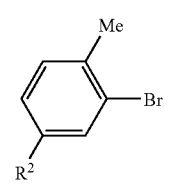
E12

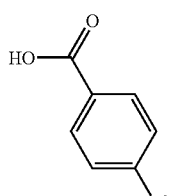
E13

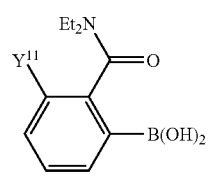
E14

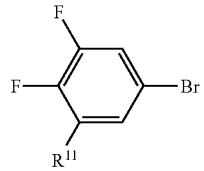
E15

When reactants E12 (instead of Z9) are used in reaction stage k), it is possible by the procedure of Scheme 3 to obtain the compounds of the formula (Id).

When the reactants E 13 (instead of E11) and E12 (instead of Z9) are used in reaction stage k), it is possible by the procedure of Scheme 3 to obtain the compounds of the formula (Ic). When the reactants E13 (instead of E11) and Z9 are used in reaction stages i), k) and n), it is possible by the procedure of Scheme 3 to obtain the compounds of the formula (Ie).

Of the reactants E12, the compounds where $R^2$=ethyl [17070-97-2] and $R^2$=methoxy [36942-56-0] are known from the literature; homologs can be prepared analogously.

Reactants E13 are commercially available as 4-alkylbenzoic acids or 4-alkyloxybenzoic acids.

Reactants E14 can be obtained by ortho-boronation (J. Org. Chem. 56, 3763 (1991)) from 2-$Y^{11}$-substituted N,N-dialkylbenzamides which may in turn be obtained from the 2-$Y^{11}$-substituted benzoic acids, for example commercially available 2-ethylbenzoic acid [612-19-1] or commercially available 2-dodecyloxybenzoic acid [143269-37-8] by conversion to the acid chloride and reaction with N,N-dialkylamine.

Reactants E15 where $R^{11}$=alkyloxy are obtained by Williamson ether synthesis from commercially available 5-bromo-2,3-difluorophenol [186590-26-1]; reactants E15 where $R^{11}$=alkyl can be obtained by analogy to Scheme 1, stage g).

When the reactants E14 (instead of Z11) and Z9 are used in reaction stage k), it is possible by the procedure of Scheme 3 to obtain the compounds of the formula (Ir, where n=0). These may be converted according to Scheme 3 to the compounds of the formula (Ip).

When the reactants E14 (instead of Z11) and E15 are used (after carrying out stage j) in reaction stage k), it is possible by the procedure of Scheme 3 to obtain the compounds of the formula (Ir, n=1). These may be converted according to Scheme 3 to the compounds of the formula (Iq).

When the reactants E14 (instead of Z11) and E12 are used in reaction stage k), it is possible by the procedure of Scheme 3 to obtain the compounds of the formula (Im).

The compounds of the type (Io) are obtainable by the procedure of Scheme 4.

When the reaction sequence of Scheme 4 is started with the reactants E10 (instead of E15), it is possible to obtain the compounds of the formula (In).

Scheme 3
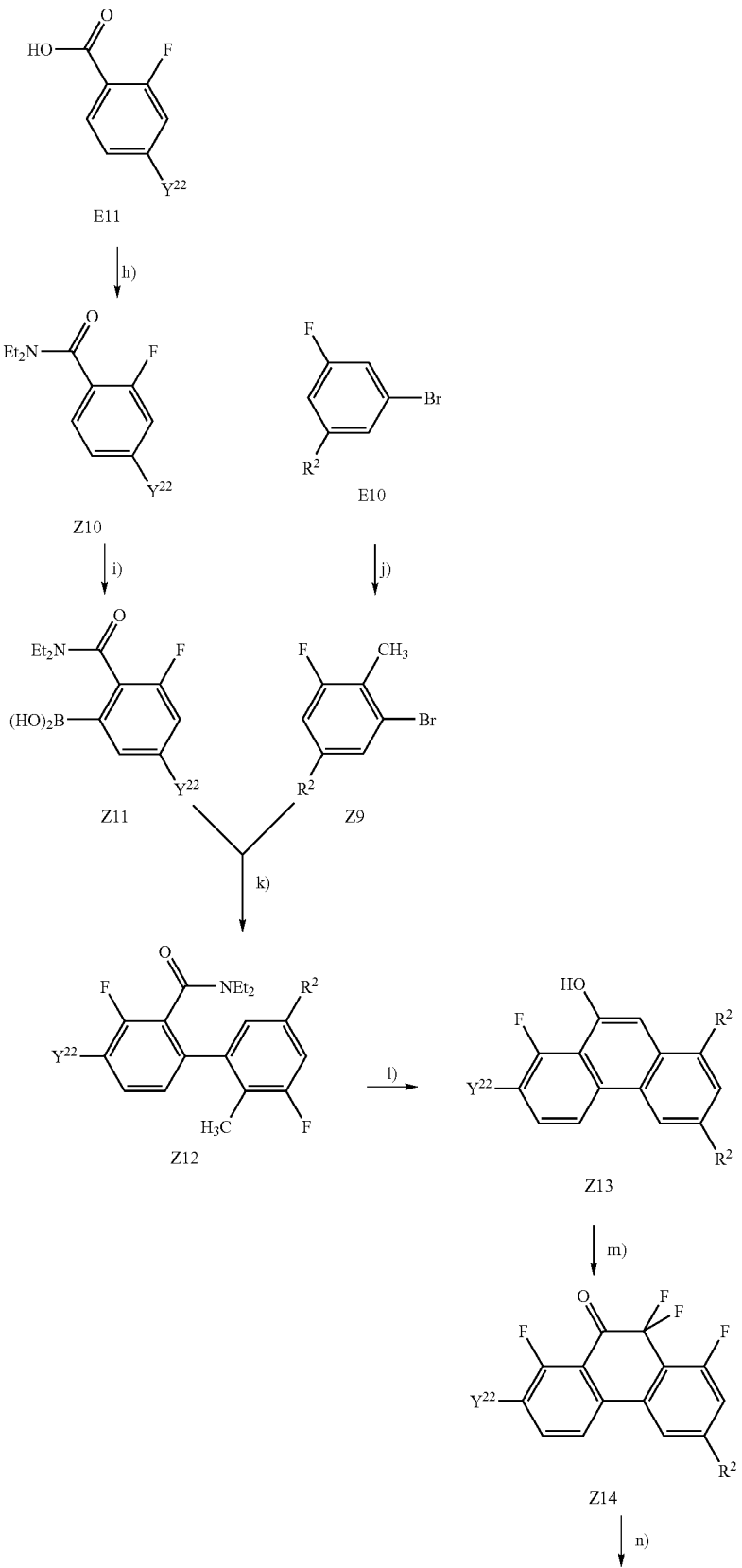

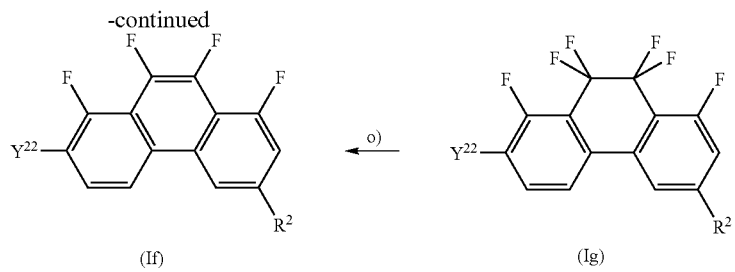

(If)                          (Ig)

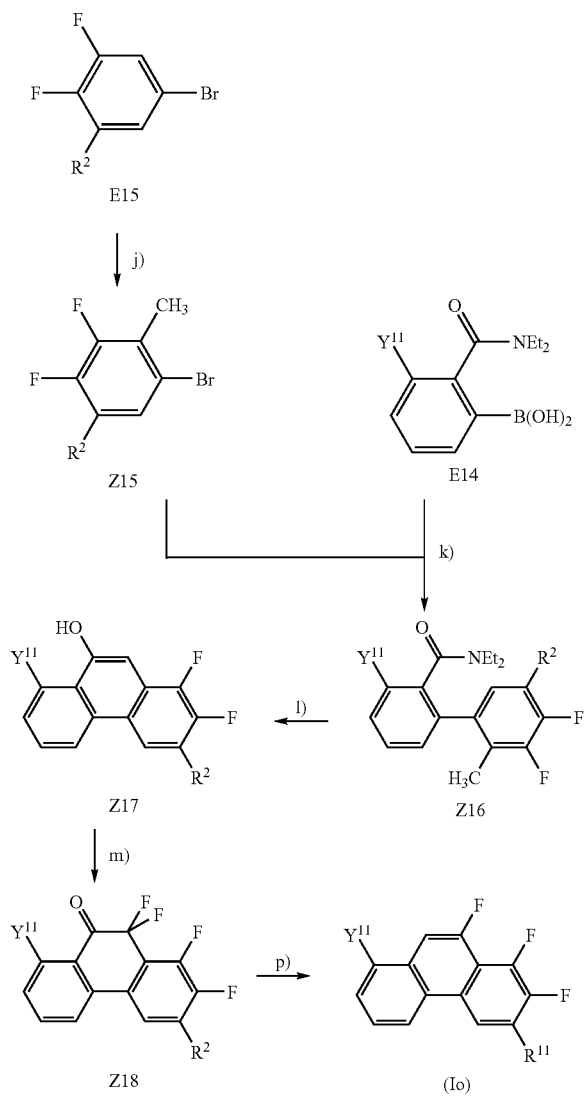

Scheme 4

The invention is illustrated in detail by the examples which follow.

EXAMPLE 1

3,4,5-Trifluoro-6-methoxy-2-propylphenanthrene
[compound (Ik) where $Y^2 = C_3H_7$ and $R^1 = OCH_3$]

A solution of 8.5 g of the compound Z4 (Scheme 1) and approx. 0.8 g of iodine in 8 l of cyclohexane was irradiated at room temperature in a UV irradiation apparatus (Heraeus laboratory UV reactor system 2 with TQ 100 mercury medium-pressure radiator, 150 watts, 200-280 nm) for 8 h. In the course of this, the solution was pumped in circulation through the reaction vessel (volume 0.7 l) via a 10 l aspirator bottle. After the end of the reaction, 150 ml of water and approx. 50 g of sodium sulfite were added, so that the solution was decolorized. After drying over sodium sulfate, the solvent was removed on a rotary evaporator and the residue was chromatographed using silica gel with 10:1 (v/v) heptane/ethyl acetate. After the solvents had been distilled off, the product-containing fractions were recrystallized from acetonitrile. 2.8 g of 3,4,5-trifluoro-6-methoxyphenanthrene were obtained.

A solution of 11 mmol of n-butyllithium (1.6 M solution in hexane) in 20 ml of dry tetrahydrofuran was cooled to $\leq -70°$ C. and admixed dropwise under a protective gas atmosphere with a solution of 11 mmol of potassium tert-butoxide in 12 ml of the same solvent. After stirring for 15-30 min, a solution of 2.8 g of 3,4,5-trifluoro-6-methoxyphenanthrene in 20 ml of tetrahydrofuran was added dropwise in such a way that the internal temperature was always below $-70°$ C. Subsequently, stirring was continued at this temperature for 2 h. 2.5 g of 1-bromopropane were then added slowly and the mixture was subsequently brought slowly to $-10°$ C. It was admixed at $-10°$ C. with 6 ml of water and acidified to pH 1 with concentrated hydrochloric acid. 100 ml of tert-butyl methyl ether were added, the phases were separated, and the organic phase was washed with saturated sodium chloride solution and dried over sodium sulfate. The solvents were removed under reduced pressure, and the residue was chromatographed using silica gel with 9:1 (v/v) heptane/ethyl acetate. The product-containing fractions were combined, the solvent was distilled off under reduced pressure and the residue was recrystallized from acetonitrile. 1.1 g of 3,4,5-trifluoro-6-methoxy-2-propylphenanthrene were obtained.

EXAMPLE 2

1,8,9,10-Tetrafluoro-6-methoxy-2-methylphenanthrene

[Compound (If) where $Y^{22} = CH_3$ and $R^2 = OCH_3$]

A solution of 50 mmol of diisopropylamine in 25 ml of tetrahydrofuran was cooled to $-30°$ C. and admixed under a protective gas atmosphere with 50 mmol of n-butyllithium (1.6 M solution in hexane). The mixture was stirred at this temperature for 15-30 min and then allowed to thaw to 0° C. Subsequently, a solution of 20 mmol of the compound Z12 (Scheme 3, $Y^{22} = CH_3$ and $R^2 = OCH_3$) in 40 ml of tetrahydrofuran was added dropwise at 0° C. The mixture was stirred at room temperature for a further 3 h, then the reaction mixture was hydrolyzed with 10 ml of sat. ammonium chloride solution and acidified slightly with dil. hydrochloric acid. The mixture was extracted with 200 ml of tert-butyl methyl ether, and the organic phase was washed with saturated sodium chloride solution and dried over sodium sulfate. The residue obtained after the solvents had been distilled off under reduced pressure was subjected to flash chromatography (silica gel, dichloromethane). The Z13-containing eluate was concentrated by evaporation under reduced pressure, dissolved in 50 ml of DMF and admixed with 8.8 g of Selectfluor reagent in portions with stirring within 30 min and subsequently stirred up to the end of the reaction (detection by means of TLC). The mixture was then admixed with double the amount of ethyl acetate, washed twice with 25 ml of water each time and dried over sodium sulfate, and the solvents were distilled off under reduced pressure. The residue was subjected to flash chromatography (silica gel, 10:1 (v/v) heptane/ethyl acetate), after the solvents had been distilled off, 2.8 g of the compound Z14 ($Y^{22}$=$CH_3$ and $R^2$=$OCH_3$) were obtained. This was dissolved in 10 ml of toluene, admixed with 4 ml of Deoxofluor reagent [i.e. bis(2-methoxyethyl) aminosulfur trifluoride] and a pipette-tip of $BF_3Et_2O$, and heated to 60° C. up to the end of the reaction (detection by means of TLC). After cooling to 0° C., 1 ml of methanol and subsequently 100 ml of saturated aqueous sodium hydrogencarbonate solution were added. After 30 ml of toluene had been added, the organic phase was removed, washed with water and dried over sodium sulfate, and the solvent was distilled off under reduced pressure. After chromatographic purification (silica gel, 10:1 (v/v) heptane/dichloromethane), 2.1 g of the compound (Ig) ($Y^{22}$=$CH_3$ and $R^2$=$OCH_3$) were obtained. This was dissolved in 20 ml of THF, admixed with 30 ml of aqueous ammonia solution (30%) and 3 g of zinc dust, and stirred at 30° C. up to the end of the reaction (detection by means of TLC). After filtration, the mixture was admixed with 50 ml of dichloromethane, the phases were separated, and the organic phase was washed twice with 20 ml each time of water and dried over sodium sulfate. After the solvents had been distilled off under reduced pressure, the residue was chromatographed using silica gel with 10:1 (v/v) heptane/ethyl acetate. The product-containing fractions were combined, the solvents were distilled off under reduced pressure and the residue was recrystallized from acetonitrile; 1.1 g of 1,8,9,10-tetrafluoro-6-methoxy-2-methylphenanthrene were obtained.

USE EXAMPLE 1

A chiral-smectic C mixture consisting of

| | |
|---|---|
| 2-(4-Heptyloxyphenyl)-5-nonylpyrimidine | 19.6% |
| 5-Nonyl-2-(4-octyloxyphenyl)pyrimidine | 19.6% |
| 5-Nonyl-2-(4-nonyloxyphenyl)pyrimidine | 19.6% |
| 2-(2,3-Difluoro-4-heptyloxyphenyl)-5-nonylpyrimidine | 6.5% |
| 2-(2,3-Difluoro-4-octyloxyphenyl)-5-nonylpyrimidine | 6.5% |
| 2-(2,3-Difluoro-4-nonyloxyphenyl)-5-nonylpyrimidine | 6.5% |
| 5-Hexyloxy-2-(4-hexyloxyphenyl)pyrimidine | 19.6% |
| (S)-4-[4'-(2-Fluorooctyloxy)biphenyl-4-yl]-1-heptylcyclohexanecarbonitrile | 2.0% | is admixed with 5% of the compound from Example 1. This results in a mixture which, as demonstrated by FIG. 1, is suitable for the operation of displays in inverse mode, since the curve profile has the required minimum and the values lying within the technical relevant range.

FIG. 1 shows the τVmin curve (r plotted against the voltage) at $T_C$-30K, monopolar pulses and a cell separation of 1.3 µm.

What is claimed is:
1. A compound of formula (I)

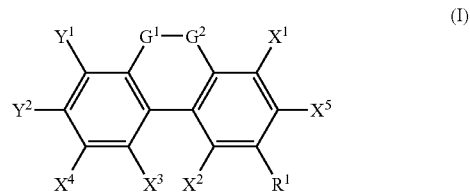

in which
$M^1$ is —CO—O—, —O—CO—, —$CH_2$—O—, —O—$CH_2$—, —$CF_2$—O—, —O—$CF_2$—, —CH=CH—, —CF=CF—, —C≡C—, —$CH_2$—$CH_2$—CO—O—, —O—CO—$CH_2$—$CH_2$—, —$CH_2$—$CH_2$—, —$CF_2$—$CF_2$—, —($CH_2$)$_4$—, —OC(=O)CF=CF— or a single bond,
$A^1$ is 1,4-phenylene in which one or two hydrogen atoms may be replaced by F, Cl, CN and/or $OCF_3$, or three hydrogen atoms may be replaced by fluorine, 1,4-cyclohexylene in which one or two hydrogen atoms may be replaced by $CH_3$ and/or F, 1-cyclohexene-1,4-diyl in which one hydrogen atom may be replaced by $CH_3$ or F, pyrimidine-2,5-diyl, pyridine-2,5-diyl or 1,3-dioxane-2,5-diyl,
$R^5$ is
a) H,
b) F,
c) a straight-chain or branched alkyl radical having 1 to 16 carbon atoms or a straight-chain or branched alkenyl radical having 2 to 16 carbon atoms, in which
c1) one or more nonadjacent and nonterminal $CH_2$ groups may be replaced by —O—, —C(=O)O—, —O—C(=O)—, —O—C(=O)—O—, —C(=O)— or —Si($CH_3$)$_2$—, and/or
c2) one $CH_2$ group may be replaced by —C≡C—, cyclopropane-1,2-diyl, cyclobutane-1,3-diyl, cyclohexane-1,4-diyl or phenylene-1,4-diyl, and/or
c3) one or more hydrogen atoms may be replaced by F and/or Cl,
$G^1$-$G^2$ is $CH_2CH_2$, CH=CH, $CF_2CF_2$, CF=CF, CF=CH, or CH=CF,
$X^1$, $X^2$, $X^3$, $X^4$, $X^5$ are, each independently, H or F, and
$R^1$ is
c) a straight-chain or branched alkyl radical having 1 to 16 carbon atoms or a straight-chain or branched alkenyl radical having 2 to 16 carbon atoms, in which
c1) one or more nonadjacent and nonterminal $CH_2$ groups may be replaced by —O—, —C(=O)O—, —O—C(=O)—, —O—C(=O)—O—, —C(=O)— or —Si($CH_3$)$_2$—, and/or
c2) one $CH_2$ group may be replaced by —C≡C—, cyclopropane-1,2-diyl, cyclobutane-1,3-diyl, cyclohexane-1,4-diyl or phenylene-1,4-diyl, and/or
c3) one or more hydrogen atoms may be replaced by F and/or Cl, or
d) -$M^1$-$A^1$-$R^5$,
$Y^1$, $Y^2$ are, each independently,
a) H, or
b) F,
wherein $Y^1$ or $Y^2$ may also have the definition c) or d), c) a straight-chain or branched alkyl radical having 1 to 16 carbon atoms or a straight-chain or branched alkenyl radical having 2 to 16 carbon atoms, in which c1) one or more nonadjacent and nonterminal $CH_2$ groups may be replaced by —O—, —C(=O)O—, —O—C(=O)—, —O—C(=O)—O—, —C(=O)— or —Si(CH$_3$)$_2$—, and/or c2) one $CH_2$ group may be replaced by —C≡C—, cyclopropane-1,2-diyl, cyclobutane-1,3-diyl, cyclohexane-1,4-diyl or phenylene-1,4-diyl, and/or c3) one or more hydrogen atoms may be replaced by F and/or Cl, or d) -$M^1$-$A^1$-$R^5$, wherein not more than one of $R^1$, $Y^1$ and $Y^2$ has the definition d) -$M^1$-$A^1$-$R^5$, with the following provisos:

a) at least one of $X^1, X^2, X^3, X^4, X^5, G^1$-$G^2$ is or contains F, b1) when at least one of $Y^1$ and $X^1$ is F and/or $G^1$-$G^2$ contains F, then $X^2, X^3, X^4$ can not be F, b2) when at least one of $X^2, X^3, X^4$ is F, then $X^1$ and $Y^1$ can not to be F, and $G^1$-$G^2$ has to be $CH_2CH_2$ or CH=CH, c) $Y^2$ and $X^5$ are not simultaneously F.

2. A liquid-crystal mixture, comprising one or more compounds of the formula (I) as claimed in claim 1.

3. A liquid-crystal mixture as claimed in claim 2, which comprises one or more compounds of formula (I) in an amount of 1 to 40% by weight based on the liquid-crystal mixture.

4. A liquid-crystal mixture as claimed in claim 2, which comprises at least three further components of smectic and/or nematic and/or cholesteric phases.

5. A liquid-crystal mixture as claimed in claim 2, which is chiral-smectic.

6. A liquid-crystal mixture as claimed in claim 2, which is nematic or cholesteric.

7. A liquid-crystal display comprising a liquid-crystal mixture as claimed in claim 2.

8. A liquid-crystal display as claimed in claim 7, which is operated in ECB, IPS or VA display mode and comprises a nematic or cholesteric liquid-crystal mixture.

9. A compound as claimed in claim 1, which is one of formulae (Ia) to (It)

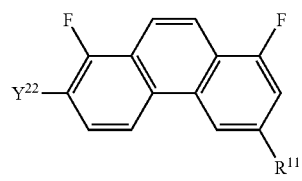

(Ia)

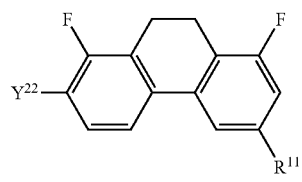

(Ib)

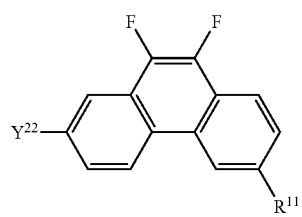

(Ic)

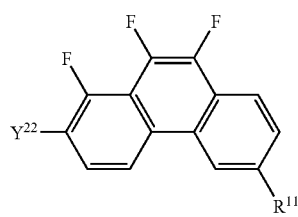

(Id)

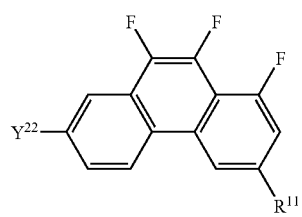

(Ie)

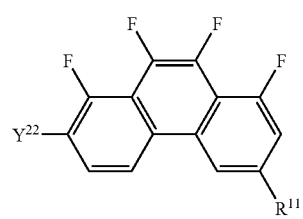

(If)

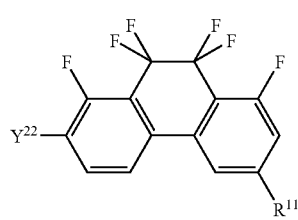

(Ig)

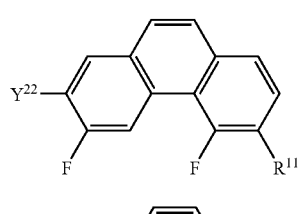

(Ih)

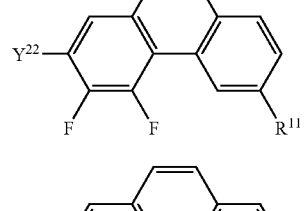

(Ii)

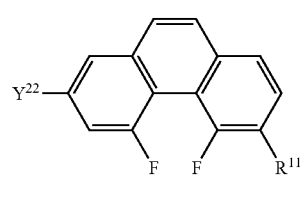

(Ij)

-continued (Ik) 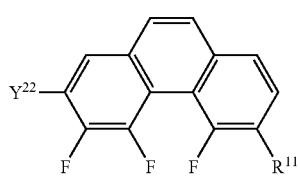

(Im) 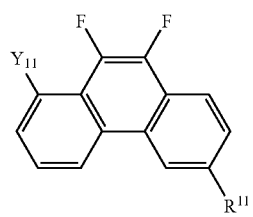

(In) 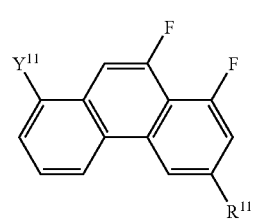

(Io) 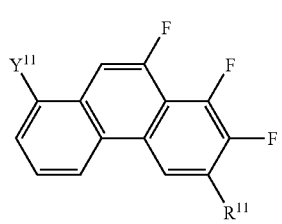

(Ip) 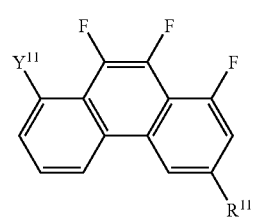

(Iq) 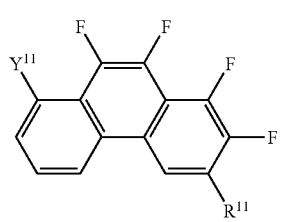

(Ir) 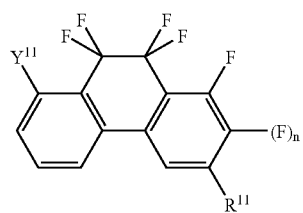

-continued (Is) 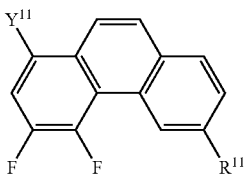

(It) 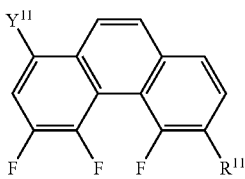

wherein
$R^{11}$ is
c) a straight-chain or branched alkyl radical having 1 to 16 carbon atoms or a straight-chain or branched alkenyl radical having 2 to 16 carbon atoms, in which
   c1) one or more nonadjacent and nonterminal $CH_2$ groups may be replaced by —O—, —C(=O)O—, —O—C(=O)—, —O—C(=O)—O—, —C(=O)— or —Si(CH$_3$)$_2$—, and/or
   c2) one $CH_2$ group may be replaced by —C≡C—, cyclopropane-1,2-diyl, cyclobutane-1,3-diyl, cyclohexane-1,4-diyl or phenylene-1,4-diyl, and/or
   c3) one or more hydrogen atoms may be replaced by F and/or Cl, or
d) -$M^{15}$-$A^{15}$-$R^{15}$-,
$Y^{11}$, $Y^{22}$ are, each independently,
a) H,
b) F,
c) a straight-chain or branched alkyl radical having 1 to 16 carbon atoms or a straight-chain or branched alkenyl radical having 2 to 16 carbon atoms, in which
   c1) one or more nonadjacent and nonterminal $CH_2$ groups may be replaced by —O—, —C(=O)O—, —O—C(=O)—, —O—C(=O)—O—, —C(=O)— or —Si(CH$_3$)$_2$—, and/or
   c2) one $CH_2$ group may be replaced by —C≡C—, cyclopropane-1,2-diyl, cyclobutane-1,3-diyl, cyclohexane-1,4-diyl or phenylene-1,4-diyl, and/or
   c3) one or more hydrogen atoms may be replaced by F and/or Cl, or
e) -$M^{15}$-$A^{15}$-$R^{15}$-,
$R^{15}$ is
a) H,
b) F,
c) a straight-chain or branched alkyl radical having 1 to 16 carbon atoms or a straight-chain or branched alkenyl radical having 2 to 16 carbon atoms, in which
   c1) one or more nonadjacent and nonterminal $CH_2$ groups may be replaced by —O—, —C(=O)O—, —O—C(=O)—, —O—C(=O)—O—, —C(=O)— or —Si(CH$_3$)$_2$—, and/or
   c2) one $CH_2$ group may be replaced by —C≡C—, cyclopropane-1,2-diyl, cyclobutane-1,3-diyl, cyclohexane-1,4-diyl or phenylene-1,4-diyl, and/or c3) one or more hydrogen atoms may be replaced by F and/or Cl, $A^{15}$ is 1,4-phenylene in which one or two hydrogen atoms may be replaced by F, Cl, CN and/or $OCF_3$, or three hydrogen atoms may be replaced by fluorine, 1,4-cyclohexylene in which one or two hydrogen atoms may be replaced by $CH_3$ and/or F, 1-cyclohexene-1,4-diyl in which one hydrogen atom may be replaced by $CH_3$ or F, pyrimidine-2,5-diyl, pyridine-2,5-diyl or 1,3-dioxane-2,5-diyl, $M^{15}$ is —CO—O—, —O—CO—, —$CH_2$—O—, —O—$CH_2$—, —$CF_2$—O—, —O—$CF_2$—O—, —O—$CF_2$—, —CH=CH—, —CF=CF—, —C≡C—, —$CH_2$—$CH_2$—CO—O—, —O—CO—$CH_2$—$CH_2$—, —$CH_2$—$CH_2$—, —$CF_2$—$CF_2$—, —$(CH_2)_4$—, —OC(=O)CF=CF— or a single bond, and n is 0 or 1, with the proviso that $R^{11}$ and $Y^{11}$ or $R^{11}$ and $Y^{22}$ must not at the same time be $R^{15}$-$A^{15}$-$M^{15}$.

10. A liquid-crystal mixture, comprising one or more compounds of claim 9.

11. A liquid-crystal display comprising a liquid-crystal mixture as claimed in claim 10.

12. A compound as claimed in claim 1, which is 3,4,5-Trifluoro-6-methoxy-2-propylphenanthrene; or 1,8,9,10-Tetrafluoro-6-methoxy-2-methylphenanthrene.

13. A liquid-crystal mixture, comprising one or more compounds of claim 12.

14. A liquid-crystal display comprising a liquid-crystal mixture as claimed in claim 13.

15. A compound as claimed in claim 9, wherein $R^{11}, Y^{11}, Y^{22}$ are, each independently, an alkyl or alkyloxy radical having 1 to 10 carbon atoms or an alkenyl or alkenyloxy radical having 2 to 10 carbon atoms, in which in each case one or more hydrogen atoms may be replaced by F, or $R^{15}$-$A^{15}$-$M^{15}$-, $R^{15}$ is an alkyl or alkyloxy radical having 1 to 10 carbon atoms or an alkenyl or alkenyloxy radical having 2 to 10 carbon atoms, $A^{15}$ is phenylene-1,4-diyl, or cyclohexane-1,4-diyl, $M^{15}$ is a single bond, —CO—O—, —O—CO—, —C≡C—, —$OCF_2$—, —$CF_2O$—, $CF_2CF_2$—, or —$CH_2CH_2$—, and n is 0 or 1.

16. A liquid-crystal mixture, comprising one or more compounds of claim 15.

17. A liquid-crystal display comprising a liquid-crystal mixture as claimed in claim 16.

18. A compound as claimed in claim 1, wherein $R^1$ is -$M^1$-$A^1$-$R^5$.

19. A liquid-crystal mixture, comprising one or more compounds of claim 18.

20. A liquid-crystal display comprising a liquid-crystal mixture as claimed in claim 19.

\* \* \* \* \*